June 2, 1931.  W. A. CHRYST  1,807,620
SHOCK ABSORBER
Filed May 8, 1930  2 Sheets-Sheet 1

Inventor
WILLIAM A. CHRYST
By Spencer, Hardman and Fehr
Attorneys

June 2, 1931.  W. A. CHRYST  1,807,620

SHOCK ABSORBER

Filed May 8, 1930  2 Sheets-Sheet 2

Inventor
WILLIAM A. CHRYST
By Spencer, Hardman and Fehr
Attorneys

Patented June 2, 1931

1,807,620

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed May 8, 1930. Serial No. 450,714.

This invention relates to improvements in double-acting hydraulic shock absorbers.

It is among the objects of the present invention to provide a hydraulic shock absorber, of simple structure and design, adapted to control both the compression and rebound movements of a vehicle spring.

Further objects and advantages of the present invention will be apparent from the following description, reference being had to the accompanying drawings wherein a preferred embodiment of one form of the present invention is clearly shown.

Figure 1:
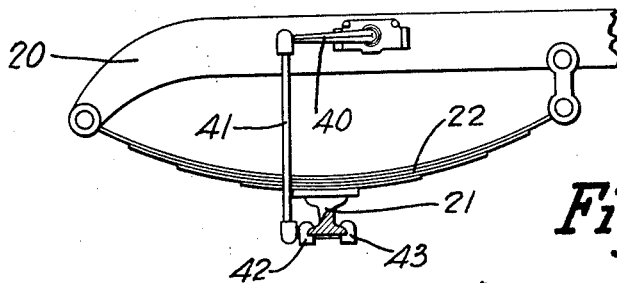
Fig. 1 is a fragmentary side view of a vehicle chassis having a shock absorber, equipped with the present invention, applied thereto. The roadwheels of the vehicle are omitted for the sake of clearness.

Referring to the drawings, the numeral 20 designates the frame of the vehicle which is supported upon the vehicle axle 21 by springs 22.

The shock absorber comprises a casing 23 providing a fluid reservoir 24 and a cylinder 25. The two open ends of the cylinder 25 are closed by cover caps 26 and 27 respectively, having suitable gaskets to prevent fluid leaks. Openings 28 are provided in the casing for receiving studs by which the shock absorber is secured to the vehicle frame 20.

Within the cylinder 25 two pistons 30 and 31 are provided which form compression chambers 32 and 33 in their respective ends of the cylinder 25.

A piston operating member is interposed between pistons 30 and 31. This piston operating member comprises a lever 34 which extends between the two pistons 30 and 31 and which engages wearpieces 35 and 36 carried by the pistons 30 and 31 respectively. The lever 34 is provided on a rocker shaft 37 which is journalled in bearings 38 and 39 provided in the casing 23. One end of the rocker shaft 38 extends outside the casing and has the shock absorber operating arm 40 attached thereto. The free end of arm 40 is swivelly secured to a link 41, the opposite end of said link being swivelly attached to a bracket 42, anchored to the axle 21 by a clamping member 43. A packing 44 having a packing gland 45 is provided about the shaft 37 at the outer end of bearing 38, preventing fluid leaks at this point.

Figure 4:
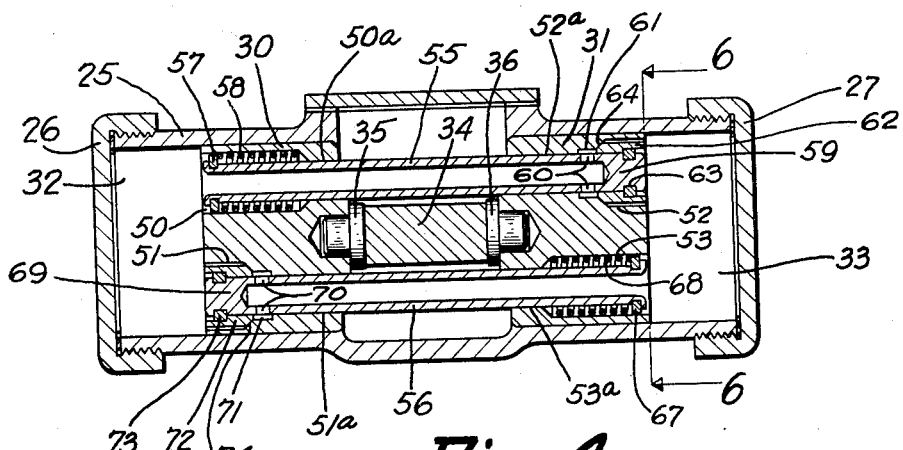
Fig. 4 is a longitudinal sectional view taken along the line 4—4 of Fig. 2.

As shown particularly in Fig. 4, piston 30 has two recesses 50 and 51 formed in the compression end thereof. Piston 31 has similar recesses 52 and 53 in its compression end. Recess 50 of the piston 30 has a reduced diameter portion 50a which is in coaxial alignment with a reduced diameter portion 52a of the recesses 52 in piston 31. Likewise recess 51 in piston 30 has a reduced diameter portion 51a in coaxial alignment with a similar reduced diameter portion 53a of the recess 53 in piston 31. The reduced diameter portions 50a and 52a of the recesses of pistons 30 and 31 respectively, slidably support a tubular member 55 at opposite ends thereof, while a similar tube 56 is slidably supported in reduced diameter portions 51a and 53a of the recesses 51 and 53 of pistons 30 and 31 respectively. At the end of the tubular member 55 extending into the recess 50 there is secured a washer 57 adapted to enter into the recess 50. A spring 58 surrounds the tubular member 55 and rests against the washer 57 and the shoulder provided by the two diameter portions of recess 50. The opposite end of the tubular member 55 is closed as at 59, the inner passage of said tubular member 55 terminating adjacent this end. Transverse passages 60 in the side of the tubular member 55 communicate with an annular chamber 61 formed in the piston 31 between the reduced diameter portion 52a and the larger diameter portion 52 of this recess. A valve 62 is secured upon the closed end 59 of the tubular member 55 by a C-washer 63 fitting into an annular groove provided in the closed end 59 of the tubular member 55. The valve 62 is maintained upon the valve seat 64, provided in the recess 52 of the piston 31, by the spring 58, which also yieldably urges the piston 31 into engagement with the piston operating lever 34. The tubular member 56 is arranged inversely between the pistons 30 and 31, that is, tubular member 56 has a washer 67 secured at the end which extends into the recess 53 of the piston 31. A spring 68 is interposed between the washer 67 and the shoulder in the recess 53. The other end 69 of the valve is closed and has the valve 72 secured thereon by a C-washer 73 corresponding to the C-washer 63 in tubular member 65. An annular chamber 71 is provided in the piston recess 51, said annular chamber being in communication with the inner passage of the tubular member 56 through transverse passages 70 which correspond to passage 60 in the tubular member 55. Spring 68 not only yieldably maintains valve 72 upon its seat 74 in recess 51, but it also yieldably urges piston 30 into engagement with the piston operating arm 34.

The pistons 30 and 31 are provided with a through passage 80 and 81 respectively, presenting valve seat 82 and 83 respectively. In the passage 80 of the piston 30 there is provided a ball check valve 84 maintained upon the seat 82 by spring 85. A similar ball check valve 86 is in the passage 81 of piston 31 and is maintained upon its seat 83 by spring 87. These two valves form the fluid replenishing valves for the two compression chambers 32 and 33.

In operation the shock absorber functions as follows:

When the roadwheels of the vehicle strike an obstruction or bump in the roadway, springs 22 will be compressed and moved toward the frame 20. This movement of the spring 22 and axle 21 will cause the link connection 41 to move the shock absorber operating arm 40 in a clockwise direction, resulting in a clockwise rotation of the rocker shaft 37 and the piston operating lever 34. Piston 30 will be pushed toward the cover cap 26 of compression chamber 32 and thus pressure is exerted upon the fluid therein. This pressure will cause fluid to be forced through the tubular member 55 and transverse passages 60 into the annular chamber 61 and, when the pressure is sufficiently high, valve 62 will move from its seat 64 against the effect of spring 58, and consequently there will be established a restricted flow of fluid from the compression chamber 32 through the tubular member 55, transverse passages 60 into the chamber 61, and from there past the valve 62 through the recess 52 into the compression chamber 33. The piston 31 will follow the piston 30 because both pistons 30 and 31 are connected together by the tubular member 56, which, in the present instance, is acting merely as a towing link. In this instance valve 72 on the tubular member 56 acts as an abutment head, which engages the bottom of the recess 51 or more specifically the valve seat 74. Pulling on the tubular member 56 will exert a pull upon spring 68 through washer 67, thus piston 31 is yieldably urged to follow the movement of the piston operating arm or lever 34 as it moves clockwise. This resilient connection compensates also for wear of the lever 34 or buttons 35 and 36.

Figure 2:
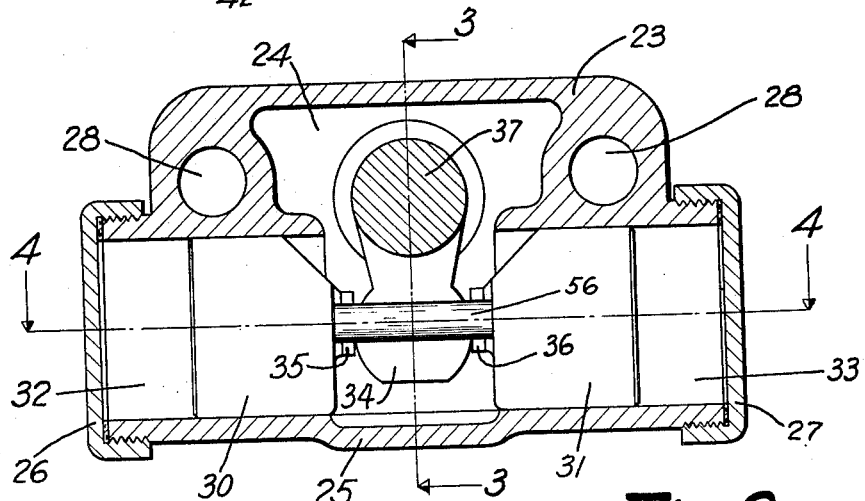
Fig. 2 is a longitudinal sectional view taken through the shock absorber, certain parts being shown in elevation.
Figure 3:
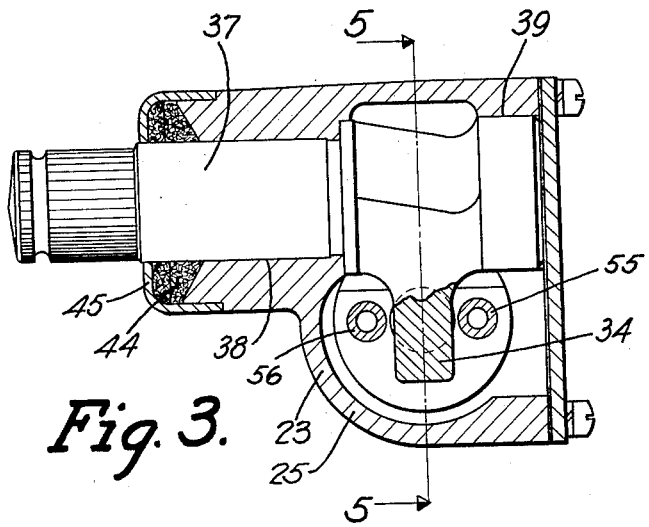
Fig. 3 is a transverse sectional view taken along the line 3—3 of Fig. 2.

As soon as the springs 22 have reached the limit of their compression caused by the striking of this particular obstruction or bump in the roadway, they will return to normal load position. As the springs 22 return to their normal position, or as they move away from frame 20, link 41 will operate the shock absorber operating arm 40 in a counter-clockwise direction, thus reversing the movement of the piston as before described, or more specifically moving the pistons toward the right as regards Figs. 2, 4 and 5. Now lever 34 is pushing the piston 31 toward the cover cap 27 of the cylinder and thus pressure is exerted upon the fluid within the compression chamber 33, causing the fluid to flow through the tubular member 56 and transverse passages 70 into the annular chamber 71, said pressure, when sufficient, forcing the valve 72 from its seat 74 against the effect of spring 68 and thus establishing a restricted fluid flow past the valve 72 through recess 51 into the compression chamber 32. In this instance tubular link 55, which acted as a fluid controlling means as the pistons were operating in the other direction now merely acts as a towing link, the valve 62 engaging its seat 64 and acting as an abutment, the link 55 pulling against the spring 58 which yieldably urges its piston 30 to follow the piston operating arm or lever 34.

Figure 5:
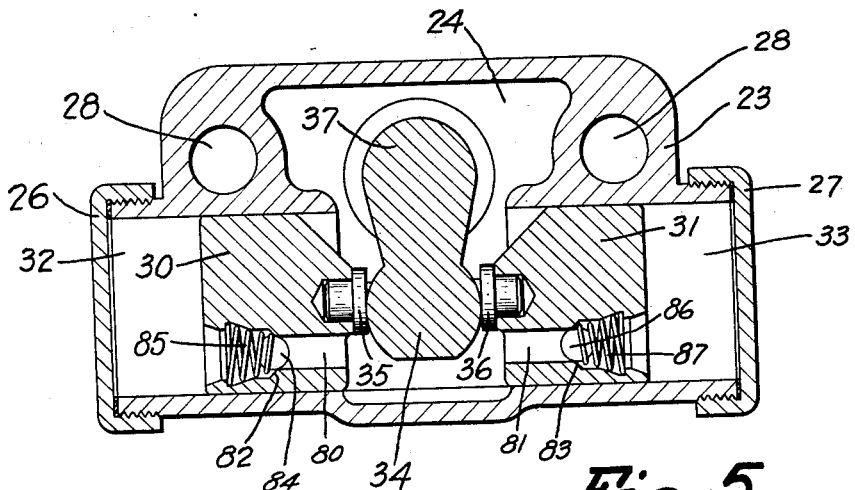
Fig. 5 is a view similar to Fig. 2, the fluid displacement member of the device being shown in section.
Figure 6:
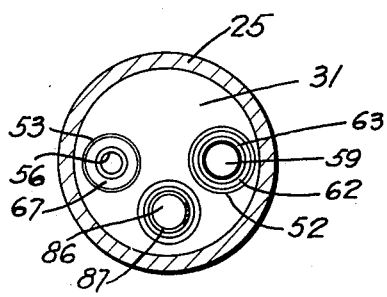
Fig. 6 is a transverse sectional view taken along the line 6—6 of Fig. 4.

As the piston 30 moves towards the left as regards Fig. 5, fluid from the fluid reservoir 24 will exert pressure upon the valve 86 to move it against the effect of spring 87 to establish a fluid replenishing flow into the compression chamber 33, said fluid replenishing being sometimes necessary due to fluid leaks occurring past the piston or at any other point. When the piston moves toward the right, valve 84 may act to replenish the fluid supply in the compression chamber 32, if it be necessary.

In the present instance applicant has provided a shock absorber capable of controlling both the compression and rebound movements of vehicle springs, said shock absorber being simply constructed and of a sturdy nature. In this instance applicant has provided two pistons connected together by means which in turn act as towing links under certain circumstances, and as fluid flow controlling means under other circumstances, thus certain elements are made to perform double functions.

While the form of embodiment of the present invention as herein disclosed, constitutes a preferred form, it is to be understood that other forms might be adopted, all coming within the scope of the claims which follow.

What is claimed is as follows:

1. A double acting, hydraulic shock absorber comprising, in combination, a casing providing a cylinder; two pistons in said cylinder; a reciprocatable piston operating member interposed between said pistons; and two elements connected between the two pistons, each element acting, in turn, as a fluid conduit and as a connecting link between the pistons, in response to movements of the piston operating member in both directions respectively.

2. A double acting, hydraulic shock absorber comprising, in combination, a casing providing a cylinder; two pistons in said cylinder; a reciprocatable piston operating member interposed between said pistons; two link members connected between said pistons, one acting as a tow-link to pull the one piston as the piston operating member is pushing the other piston toward its respective end of the cylinder, the other link member acting as a fluid flow controlling device for said other piston.

3. A double acting, hydraulic shock absorber comprising, in combination, a casing providing a cylinder; two pistons in said cylinder; a reciprocatable piston operating member interposed between said pistons; tubular members connected between the two pistons, said tubular members acting inversely in turn as fluid conduits and as connecting links between the pistons, in response to movements of the piston operating member in both directions.

4. A double acting, hydraulic shock absorber comprising, in combination, a casing providing a cylinder; two pistons in said cylinder; a reciprocatable piston operating member interposed between said pistons; and two tubular members connected between the two pistons, one acting as a fluid conduit and the other as a tow-rod for the one piston as the other piston is being pushed by the piston operating member, the action of said tubular members being inversed with reverse movement of the piston operating member.

5. A double acting, hydraulic shock absorber for controlling the action of a vehicle spring comprising, in combination, a casing providing a cylinder; two pistons in said cylinder forming a compression chamber at each end thereof, one for controlling compression of the vehicle spring, the other for controlling its rebound movement; a reciprocatable piston operating member interposed between said pistons; and members having their end portions slidably supported in the respective pistons, one member having a yieldable connection with the spring compression controlling piston, the other member providing a fluid flow controlling valve in said piston, the said one member providing a fluid flow controlling valve in the spring rebound controlling piston and the said other member having a yieldable connection with the said piston.

6. A double acting, hydraulic shock absorber for controlling the action of a vehicle spring comprising, in combination, a casing providing a cylinder; two pistons in said cylinder forming a compression chamber at each end thereof, one for controlling compression of the vehicle spring, the other for controlling its rebound movement; a reciprocatable piston operating member interposed between said pistons; two tubular members supported between the pistons so as to be movable relative to said pistons, one tubular member providing a fluid flow controlling member in the spring compression controlling piston and having a yieldable connection with the other piston, the other tubular member having a yieldable connection with said spring compression controlling piston and providing a fluid flow controlling valve in said other piston.

7. A double acting, hydraulic shock absorber for controlling the action of a vehicle spring comprising, in combination, a casing providing a cylinder; two pistons in said cylinder, forming a compression chamber at each end thereof, one for controlling compression of the vehicle spring, the other for controlling its rebound movement; said pistons each forming a compression chamber at their respective ends of the cylinder; a piston operating member interposed between said pistons; a tubular member slidably supported at its ends in the respective pistons and providing for the transfer of fluid from one compression chamber to the other; a spring in the one piston yieldably connecting the tubular member to said piston; and a valve on the end portion of the tubular member supported in the other piston, said valve establishing a flow of fluid through the tubular member in response to the movement of said tubular member relative to both pistons as the piston, yieldably connected to said tubular member, moves to decrease the cubical area of its compression chamber.

8. A double acting, hydraulic shock absorber for controlling the action of a vehicle spring comprising, in combination, a casing providing a cylinder; two pistons in said cylinder forming a compression chamber at each end thereof, one for controlling compression of the vehicle spring, the other for controlling its rebound movement; each piston having recesses in their compression ends; a piston operating member interposed between the pistons; two tubular members slidably carried by the pistons, each end of said tubular members extending into a recess in the piston, one tubular member having a closed end in the recess of one piston, the other tubular member having a closed end in a recess of the opposite piston, each tubular member having transverse passages adjacent their closed ends; a valve on each tubular member at its closed end said valves cooperating with their respective pistons normally to shut off fluid flow from the transverse passages; washers secured to each tubular member at its end opposite the valve; and a spring on each tubular member, interposed between its washer and the bottom of the recess in its respective piston.

9. A double acting, hydraulic shock absorber for controlling the movements of a vehicle spring comprising, in combination, a casing providing a cylinder; two pistons in said cylinder, one for controlling the compression, the other for controlling the rebound movements of the vehicle spring, each piston forming a compression chamber at its respective end of the cylinder; a piston operating member interposed between said pistons; a tubular member having a valve-head at one end which cooperates with a valve-seat in the piston for controlling spring compression; and a spring interposed between the other end of said tubular member and the piston for controlling spring rebound movements, said spring maintaining said piston in engagement with the operating member as it pushes the spring compression piston toward its respective end of the cylinder, said spring also yieldably urging the valve-head of the tubular member upon the valve-seat provided by the spring compression controlling piston.

10. A double acting, hydraulic shock absorber for controlling the movements of a vehicle spring comprising, in combination, a casing providing a cylinder; two pistons in said cylinder, one for controlling the compression, the other for controlling the rebound movements of the vehicle spring, each piston forming a compression chamber at its respective end of the cylinder; a piston operating member interposed between said pistons; a tubular member having a valve-head at one end which cooperates with a valve-seat in the piston for controlling spring compression; and a spring interposed between the other end of said tubular member and the piston for controlling spring rebound movements said spring maintaining said piston in engagement with the operating member as it pushes the spring compression piston toward its respective end of the cylinder, said spring also yieldably urging the valve-head of the tubular member upon the valve-seat provided by the spring compression controlling piston, and a second tubular member, having a valve-head portion cooperating with a valve-seat in the spring rebound controlling piston; a spring interposed between said second tubular member and the spring compression controlling piston, for causing said piston to follow the operating member as it pushes the spring rebound controlling piston toward its respective end of the cylinder, and for yieldably urging the valve-head of this second tubular member upon its valve-seat.

11. A shock absorber comprising, in combination, a casing providing a fluid reservoir and a cylinder; two pistons in said cylinder forming a compression chamber at each end thereof; a piston operating member interposed between said pistons; a valve in the one piston; a tubular stem for said valve extending from said one piston into the other piston, said stem being slidable relative to both pistons; and a spring interposed between the tubular valve stem and the said other piston, said spring normally urging the pistons against the piston operating member and the valve upon the valve-seat provided in its respective piston.

12. A double acting, hydraulic shock absorber for controlling the action of a vehicle spring comprising, in combination, a casing providing a cylinder; two pistons in said cylinder forming a compression chamber at each end thereof, one for controlling compression of the vehicle spring, the other for controlling its rebound movement; a reciprocatable piston operating member interposed between said pistons; two tubular members slidably supported at their ends in the respective pistons and providing for the transfer of fluid from one compression chamber to the other; a valve in the spring compression controlling piston cooperating with one tubular member to control the flow of fluid from the compression chamber of the spring rebound controlling piston as it moves to decrease the cubical area of said chamber; a similar valve in the spring rebound controlling piston, cooperating with one of the tubular members therein to control the flow of fluid from the compression chamber of the spring compression controlling piston as it moves to decrease the cubical area of said chamber; and springs acting upon the tubular members yieldably to urge their valves into closing position.

In testimony whereof I hereto affix my signature.

WILLIAM A. CHRYST.